(12) United States Patent
Shijo et al.

(10) Patent No.: US 11,095,161 B2
(45) Date of Patent: Aug. 17, 2021

(54) POWER TRANSMISSION APPARATUS, WIRELESS POWER TRANSFER SYSTEM, AND POWER TRANSMISSION METHOD

(71) Applicant: KABUSHIKI KAISHA TOSHIBA, Minato-ku (JP)

(72) Inventors: Tetsu Shijo, Setagaya (JP); Koji Ogura, Tachikawa (JP); Masatoshi Suzuki, Susono (JP); Yasuhiro Kanekiyo, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/814,731

(22) Filed: Mar. 10, 2020

(65) Prior Publication Data

US 2021/0006094 A1 Jan. 7, 2021

(30) Foreign Application Priority Data

Jul. 1, 2019 (JP) .............................. JP2019-123180

(51) Int. Cl.
*H02J 50/12* (2016.01)
*H02J 7/02* (2016.01)
*H02J 50/40* (2016.01)

(52) U.S. Cl.
CPC ................ *H02J 50/12* (2016.02); *H02J 7/02* (2013.01); *H02J 50/40* (2016.02)

(58) Field of Classification Search
CPC ................ H02J 50/12; H02J 50/40; H02J 7/02
See application file for complete search history.

(56) References Cited

U.S. PATENT DOCUMENTS

| 2012/0032521 | A1 | 2/2012 | Inoue et al. |
| 2018/0269717 | A1 | 9/2018 | Shijo et al. |
| 2019/0006843 | A1 | 1/2019 | Suzuki et al. |
| 2019/0288541 | A1 | 9/2019 | Ogura |

(Continued)

FOREIGN PATENT DOCUMENTS

| JP | 2010-193598 A | 9/2010 |
| JP | 2015-33316 A | 2/2015 |

(Continued)

OTHER PUBLICATIONS

Kent Inoue, et al., "Reduction on Radiation Noise Level for Inductive Power Transfer Systems with Spread Spectrum focusing on Combined Impedance of Coils and Capacitors" IEEE Energy Conversion Congress & Exposition 2016, No. 308, Sep. 2016, 8 pages.

(Continued)

*Primary Examiner* — Robert L Deberadinis
(74) *Attorney, Agent, or Firm* — Oblon, McClelland, Maier & Neustadt, L.L.P.

(57) ABSTRACT

According to one embodiment, power transmission circuitry configured to generate a magnetic field by AC current flowing through a coil, and to transmit AC power by coupling the magnetic field with a coil of a power reception apparatus, wherein a frequency of the AC current is higher than a frequency of AC power supply to the power transmission apparatus; and control circuitry configured to change a frequency of the AC current in accordance with a first order of first to n-th frequencies during a power transmission of the power transmission circuitry, wherein the first order comprises each of the first to n-th frequencies one time.

16 Claims, 20 Drawing Sheets

(56) References Cited

U.S. PATENT DOCUMENTS

| | | |
|---|---|---|
| 2019/0288568 A1 | 9/2019 | Ogura et al. |
| 2020/0021146 A1 | 1/2020 | Ogura |

FOREIGN PATENT DOCUMENTS

| | | |
|---|---|---|
| JP | 2018-157614 A | 10/2018 |
| JP | 2019-17134 A | 1/2019 |
| JP | 2019-161860 A | 9/2019 |
| JP | 2019-161866 A | 9/2019 |
| JP | 2020-10415 A | 1/2020 |
| JP | 2020-10578 A | 1/2020 |

OTHER PUBLICATIONS

Kent Inoue, et al., "Reduction in Radiation Noise Level for Inductive Power Transfer Systems Using Spread Spectrum Techniques", IEEE Transactions on Power Electronics, vol. 33, No. 4, Apr. 2018, 10 pages.

etc.

POWER TRANSMISSION APPARATUS, WIRELESS POWER TRANSFER SYSTEM, AND POWER TRANSMISSION METHOD

CROSS REFERENCE TO RELATED APPLICATIONS

This application is based upon and claims the benefit of priority from the prior Japanese Patent Application No. 2019-123180, filed on Jul. 1, 2019, the entire contents of which are incorporated herein by reference.

FIELD

Embodiments described herein relate to a power transmission apparatus, a wireless power transfer system, and a power transmission method.

BACKGROUND

There has been wireless power transfer that charges or supplies power in a non-contact manner using mutual induction between coils. In the wireless power transfer, high-frequency current flows into a coil of a power transmission apparatus. Accordingly, it is feared that radiated emission (disturbance waves) are output from the power transmission apparatus, thus electromagnetically interfering with broadcast and wireless communication. Limits of intensities of radiated emission from power transmission apparatuses are recommended by international standards of CISPR (Comité International Spécial des Perturbations Radioélectriques). Among domestic laws, the Radio Act regulates the intensities of radiated disturbance waves of equipment utilizing high frequency current and the like.

Related technology includes a technique of frequency-diffusing the transmission power by temporally changing the frequency of high-frequency current output from an inverter of a power transmission apparatus, thus reducing the intensity of radiated disturbance waves.

The technique of reducing radiated emission due to frequency diffusion has a problem in that provided that there are a plurality of power transmission apparatuses, the frequencies of individual power transmission apparatuses become identical at certain timing, thus enhancing radiated emission each other at the timing. If a plurality of power transmission apparatuses do not use frequency diffusion and the power transmission apparatuses are operated at different frequencies, mutual enhancement of emission can be avoided. Unfortunately, in this case, certain power transmission apparatuses use only inefficient frequencies, which causes inequality among the power transmission apparatuses.

DETAILED DESCRIPTION

According to one embodiment, power transmission circuitry configured to generate a magnetic field by AC current flowing through a coil, and to transmit AC power by coupling the magnetic field with a coil of a power reception apparatus, wherein a frequency of the AC current is higher than a frequency of AC power supply to the power transmission apparatus; and control circuitry configured to change a frequency of the AC current in accordance with a first order of first to n-th frequencies during a power transmission of the power transmission circuitry, wherein the first order comprises each of the first to n-th frequencies one time. Hereinafter, referring to the diagrams, embodiments of the present invention are described.

First Embodiment

Figure 1:
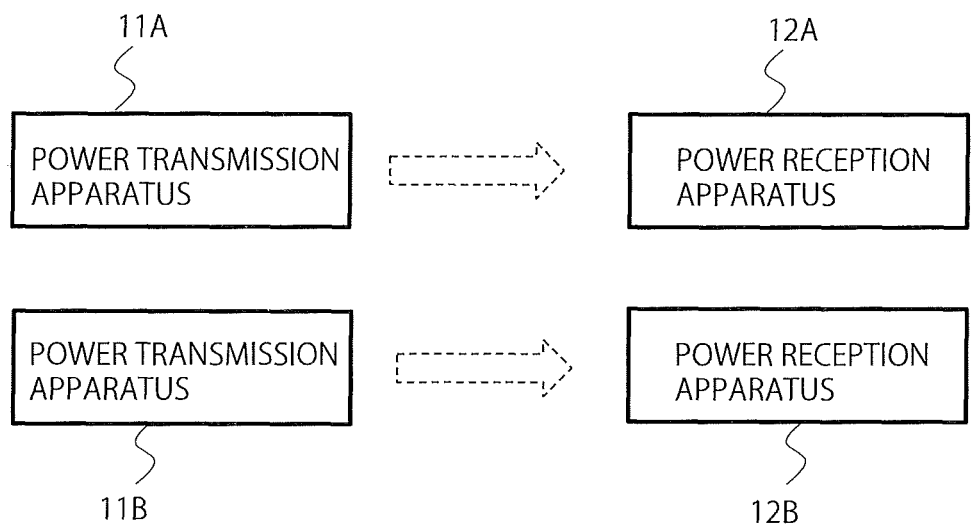
FIG. 1 shows an overall configuration of a wireless power transfer system according to this embodiment.

FIG. 1 shows an overall configuration of a wireless power transfer system according to this embodiment. This system includes a plurality of power transmission apparatuses 11A and 11B that wirelessly transmit high-frequency power, and a plurality of power reception apparatuses 12A and 12B that receive the high-frequency power from the power transmission apparatuses. The power transmission apparatuses 11A and 11B and the power reception apparatuses 12A and 12B are preliminarily associated with each other on a one-to-one basis. The power transmission apparatuses 11A and 11B transmit high-frequency power to the respectively associated power reception apparatuses 12A and 12B. The power reception apparatuses 12A and 12B charge batteries or supply resistive elements (e.g., motors and the like) with electric power received from the respective power transmission apparatuses 11A and 11B. According to the example in the diagram, the numbers of power transmission apparatuses and power reception apparatuses are each two. Alternatively, the numbers may each be three or more. In the following description, if the power transmission apparatuses 11A and 11B are not necessarily specifically discriminated from each other, any power transmission apparatus is denoted as a power transmission apparatus 11. If the power reception apparatuses 12A and 12B are not necessarily specifically discriminated from each other, any power reception apparatus is denoted as a power reception apparatus 12.

Figure 2:
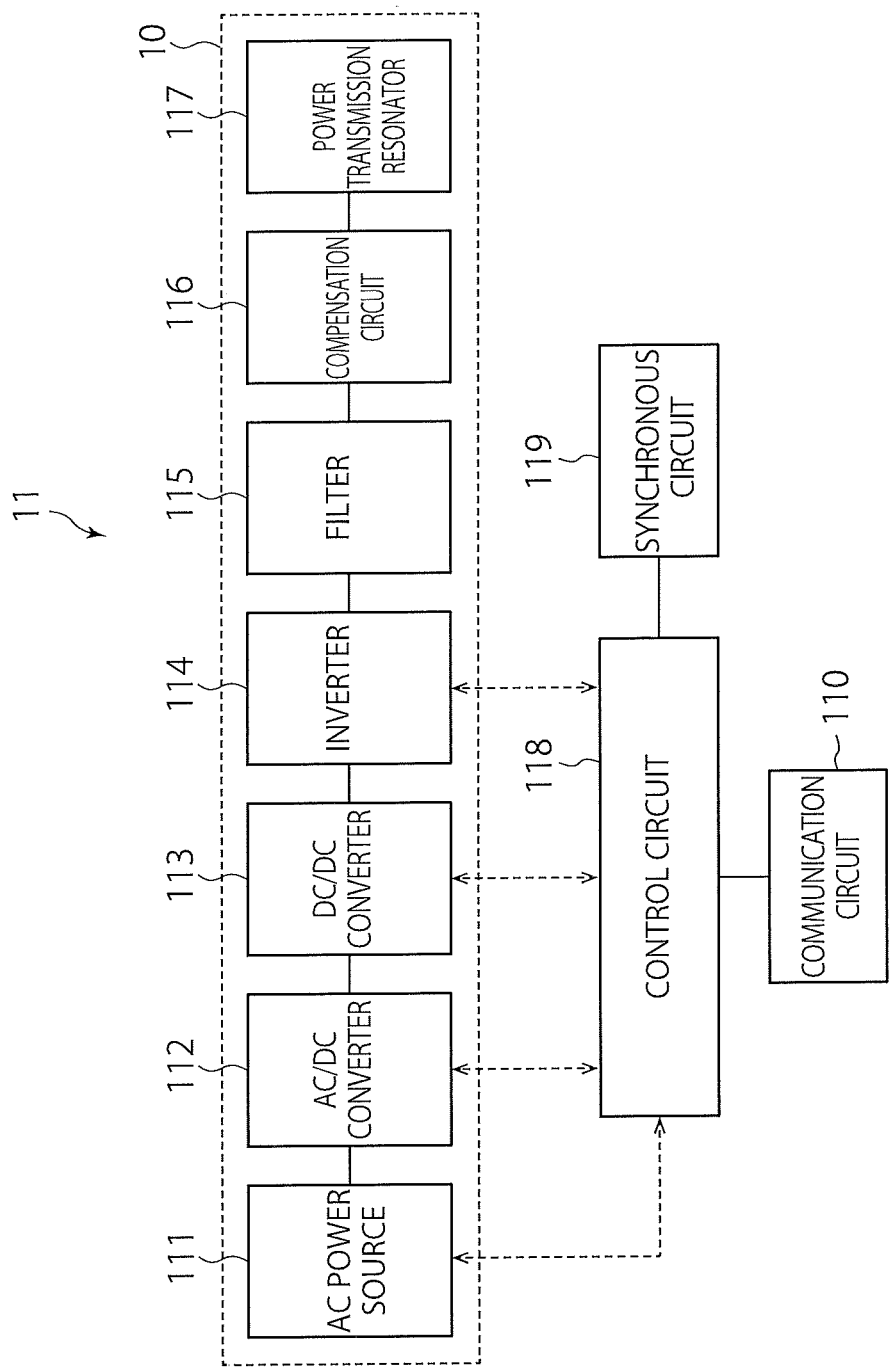
FIG. 2 shows a block diagram of a power transmission apparatus according to this embodiment.

FIG. 2 shows a block diagram of the power transmission apparatus 11. The power transmission apparatus 11 includes an AC power source 111, an AC/DC converter 112, a DC/DC converter 113, an inverter 114, a filter 115, a compensation circuit 116, a power transmission resonator 117, a control circuit (controlling circuitry) 118, a synchronous circuit 119, and a communication circuit 110. The elements 111 to 117 constitute a power transmission unit (power transmission circuitry) 10 that generates a magnetic field according to AC power flowing in a coil, and couples the magnetic field with a coil of a power reception apparatus, thereby transmitting the AC power. The elements 111 to 114 are connected to the control circuit 118, and are controlled by the control circuit 118. Signals transmitted and received between the elements 111 to 114 and the control circuit 118 are indicated. Examples of the signals include signals through which the control circuit 118 issues instructions for operations for the respective elements. Other examples of the signals include signals for notifying the operation states and the values of voltages or currents at predetermined places of the respective elements to the control circuit 118. Signals other than those described here may be exchanged.

The AC power source 111 supplies AC power (AC voltage and alternating current) at a certain frequency. An example of the AC power source 111 may be a device that outputs AC voltage, such as of three-phase 200 V or single-phase 100 V. The frequency of the AC voltage or the alternating current is, 50 or 60 Hz, for example.

The AC/DC converter 112 is a circuit that is connected to the AC power source 111 via wiring (a cable or the like), and converts the voltage of AC power supplied from the AC power source 111 into a DC voltage.

The DC/DC converter 113 is a circuit that is connected to the AC/DC converter 112 via wiring, and converts (steps up or down) the DC voltage supplied from the AC/DC converter 112 into a different DC voltage. The DC/DC converter 113 includes switching elements, for example, semiconductor switches or the like, and converts the voltage by controlling these switching elements. By controlling the frequencies and pulse widths of the switching elements, the step-up ratio or the step-down ratio (hereinafter described as step-up/down ratio) can be controlled. A configuration without the DC/DC converter 113 can be adopted.

The inverter 114 is a circuit that is connected to the DC/DC converter 113 via wiring, and generates AC power (AC current and AC voltage) on the basis of the DC voltage supplied from the DC/DC converter 113. The inverter 114 generates AC power through pulse width modulation (PWM) using a switching element, for example. In the pulse width modulation, the output voltage is controlled by controlling the pulse width. For example, a pulse is output at every constant time period. When the pulse width is increased, a higher voltage is output. When the pulse width is reduced, a lower voltage is output. The frequency of the AC current can be controlled by controlling the frequency of switching. The inverter 114 supplies the generated AC power to the filter 115.

The filter 115 is connected to the inverter 114 via wiring, and is a low-pass filter or a band-pass filter that removes a noise component from the signal of AC power generated by the inverter 114.

The compensation circuit 116 is a circuit that is connected to the filter 115 via wiring, and improves the power factor of AC power input from the filter 115. The compensation circuit 116 is a capacitor, for example. The power factor is the represented ratio of the effective power to the apparent power. In view of effective power transmission, it is preferable that the reactive power be small, and the power factor be set to a value close to one. The power transmission resonator 117 includes an inductive load. Accordingly, the phase of current delays from that of the voltage, thus causing the reactive power. The compensation circuit 116 reduces the phase difference between voltage and current. This reduction improves the power factor and, in turn, improves the power transfer efficiency.

The power transmission resonator 117 is connected to the compensation circuit 116 via wiring, and receives the power-factor-improved AC power from the compensation circuit 116. The power transmission resonator 117 is a resonance circuit that includes a coil (inductor) and a capacitor (capacitance), for example. The power transmission resonator 117 generates a magnetic field through the coil according to the high-frequency power (high-frequency current) received from the compensation circuit 116. The power transmission resonator 117 couples the magnetic field with the coil of a power reception resonator 121 of the power reception apparatus, thereby achieving wireless power transfer.

Figure 3A:
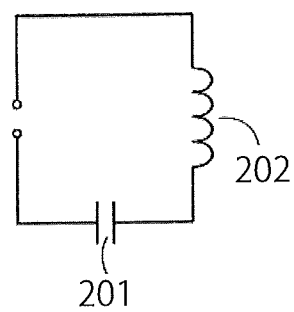
FIGS. 3A to 3C show a configuration example of a power transmission resonator.
Figure 3B:
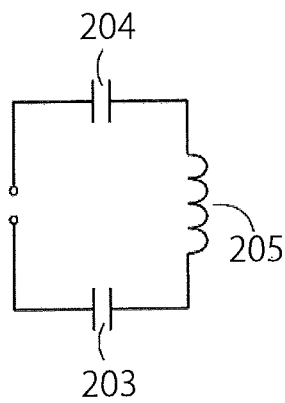
Figure 3C:
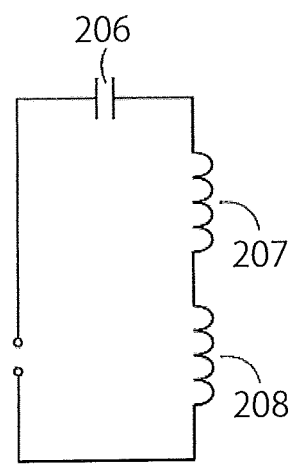

FIGS. 3A, 3B and 3C show configuration examples of the power transmission resonator 117. In the configuration of FIG. 3A, a capacitor 201 is connected to one end of a coil 202 in series. The capacitor 201 may be connected on the opposite side unlike that in FIG. 3A, that is, the other end of the coil 202. As shown in FIG. 3B, capacitors 203 and 204 may be connected respectively to the opposite ends of a coil 205. As shown in FIG. 3C, a plurality of coils 207 and 208 and a capacitor 206 may be connected in series. The coils 202, 205, 207 and 208 shown in FIGS. 3A to 3C may be respectively wound around magnetic cores. The coil shape may be made by any of spiral winding, solenoidal winding or the like. A configuration other than those shown in FIGS. 3A to 3C may be adopted.

The control circuit 118 changes the frequency of the output current of the inverter 114, that is, the frequency of AC power, in an order (first order) of a plurality of frequencies. Below, changing the frequency of the output current is called sweeping the frequency of the output current. The order of frequencies to be changed (sweeped) is called a sweep pattern. Accordingly, the control circuit 118 changes the frequency of the output current (AC current) in the weep pattern. The plurality of frequencies correspond to first to n-th ("n" is an integer of two or more) frequencies, respectively. Thus, the power transmission frequency is diffused on the temporal axis. The frequency is swept by controlling the frequency of switching of the inverter, for example.

Specifically, it is assumed that a sweep for one sweep pattern is a sweep for one cycle. The frequency sweep in conformity with the sweep pattern is repetitively performed. Here, the sweep pattern designates the sweep order using the plurality of frequencies one time for each. That is, in one sweep pattern, no identical frequency can be used redundantly.

Power transmission apparatuses use sweep patterns having the positions of frequencies in the sweep order entirely different from each other. The power transmission apparatuses synchronize the temporal cycles of frequency transition, with each other. That is, the frequency transition timing and the time period of power transmission at each frequency are the same in each power transmission apparatus. Consequently, a plurality of power transmission apparatuses do not use the same frequency at the same time, thus preventing radiated emission (disturbance waves) from being mutually enhanced.

Specific examples of sweep patterns set in the power transmission apparatuses are described later.

The communication circuit 110 wirelessly or wiredly communicates with the other power transmission apparatuses according to predetermined procedures. The communication protocol may be dedicated standards, or general standards, such as wireless LAN or Bluetooth Low Energy (R).

The synchronous circuit 119 detects the sweep patterns used by the other power transmission apparatuses. The synchronous circuit 119 selects a sweep pattern different from the patterns of the other power transmission apparatuses on the basis of the detected sweep patterns, and notifies the selected sweep pattern to the control circuit 118. The control circuit 118 performs sweeping using the notified sweep pattern. The sweep pattern may be detected by searching radio waves in a range of frequency sweeping, or obtaining information on the sweep patterns used by the other power transmission apparatuses, from the other power transmission apparatuses via the communication circuit 110. If the other power transmission apparatuses have not started power transmission yet and the power transmission apparatus concerned starts power transmission simultaneously with the other power transmission apparatuses, the sweep pattern used by the power transmission apparatus may be determined through negotiation via the communication circuit 110.

The synchronous circuit 119 performs a synchronization process for frequency transition timing, with the other power transmission apparatuses, via the communication circuit 110. More specifically, the synchronous circuit 119 detects the temporal cycles (or transition timing) of frequency transition by the other power transmission apparatuses before starting power transmission, and notifies the detected temporal cycle to the control circuit 118. The temporal cycle may be detected by searching radio waves in the range of frequency sweeping, or obtaining information on the temporal cycle from the other power transmission apparatuses via the communication circuit 110. The control circuit 118 performs control to sweep the frequency and transmit power in conformity with the notified temporal cycle. If the other power transmission apparatuses have not started power transmission yet and the power transmission apparatus concerned starts power transmission simultaneously with the other power transmission apparatuses, the power transmission start timing and the temporal cycle of frequency transition may be determined through negotiation via the communication circuit 110. In this case, the control circuit 118 starts power transmission at the start timing determined by the synchronous circuit 119, and sweeps the frequency at the temporal cycle determined by the synchronous circuit 119.

Figure 4:
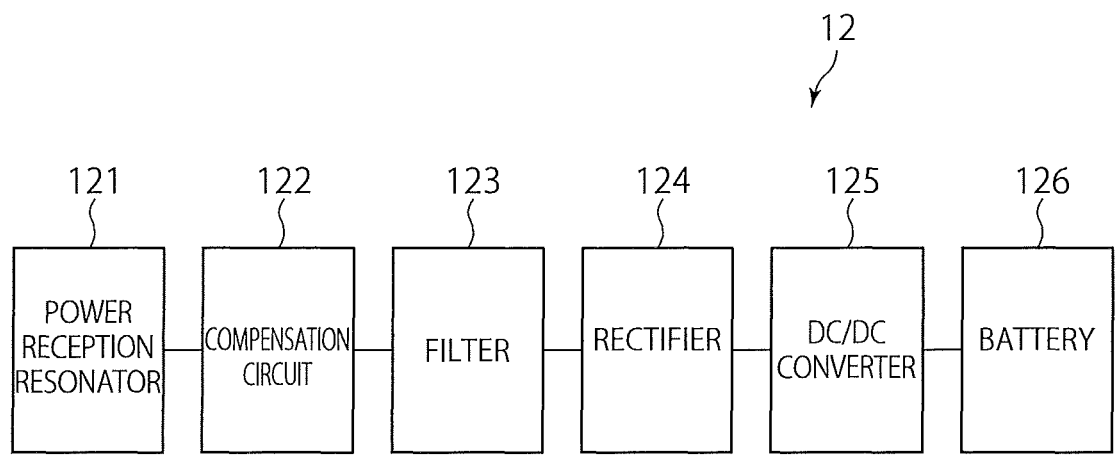
FIG. 4 shows a block diagram of a power reception apparatus according to this embodiment.

FIG. 4 shows a block diagram of the power reception apparatus 12. The power reception apparatus 12 includes the power reception resonator 121, a compensation circuit 122, a filter 123, a rectifier 124, a DC/DC converter 125, and a battery 126. Here, the battery 126 is a part of the power reception apparatus 12, but may be defined as a device outside of the power reception apparatus 12.

The power reception resonator 121 is coupled with the magnetic field radiated from the power transmission resonator 117 of the power transmission apparatus 11, thereby wirelessly receiving the AC power. The power reception resonator 121 is coupled with the power transmission resonator 117 at any coupling coefficient. The power reception resonator 121 supplies the received AC power to the compensation circuit 122. Similar to the power transmission resonator 117, the power reception resonator 121 can be achieved by any of the configurations in FIGS. 3A to 3C. The resonant frequency of the power reception resonator 121 is the same resonant frequency as the power transmission resonator 117, or has a value close thereto. Accordingly, efficient wireless power transfer can be achieved.

The compensation circuit 122 is a circuit that is connected to the power reception resonator 121 via wiring, and improves the power factor of AC power supplied from the power reception resonator 121. The compensation circuit 122 is a capacitor, for example. Typically, the load side with respect to the compensation circuit 122 is inductive, which causes reactive power accordingly. The compensation circuit 122 operates so as to reduce the phase difference of current and voltage. The power factor is thus set to a value close to one, which achieves effective power reception.

The filter 123 is connected to the compensation circuit 122 via wiring, and is a low-pass filter or a band-pass filter that removes a noise component from the signal of AC power whose power factor has been improved by the compensation circuit 122.

The rectifier 124 is connected to the filter 123 via wiring, and converts the power (AC power) received from the filter 123 into a DC voltage. That is, the rectifier 124 is an AC/DC conversion circuit that converts AC into DC. Any configuration may be adopted for the rectifier 124, which is configured by a diode bridge, for example.

The DC/DC converter 125 is connected to the rectifier 124 via wiring, and converts the DC voltage output from the rectifier 124 into a voltage (higher than, identical to, or lower than the constant DC voltage) usable by the battery 126, and outputs the voltage. The DC/DC converter 125 includes switching elements, for example, semiconductor switches or the like, and converts the voltage by controlling the operations of these switching elements. By controlling the frequencies of the switching elements, the step-up ratio or the step-down ratio (hereinafter described as step-up/down ratio) can be controlled.

The battery 126 is a device that accumulates the power input from the DC/DC converter 125. Instead of the battery 126, a resistive element (motor or the like), which consumes the power, may be adopted. The resistive element and the battery are collectively called a load device.

Hereinafter, sweep patterns respectively set in two power transmission apparatuses according to this embodiment when the power transmission apparatuses simultaneously transmit power through frequency diffusion, are described in detail.

Figure 5:
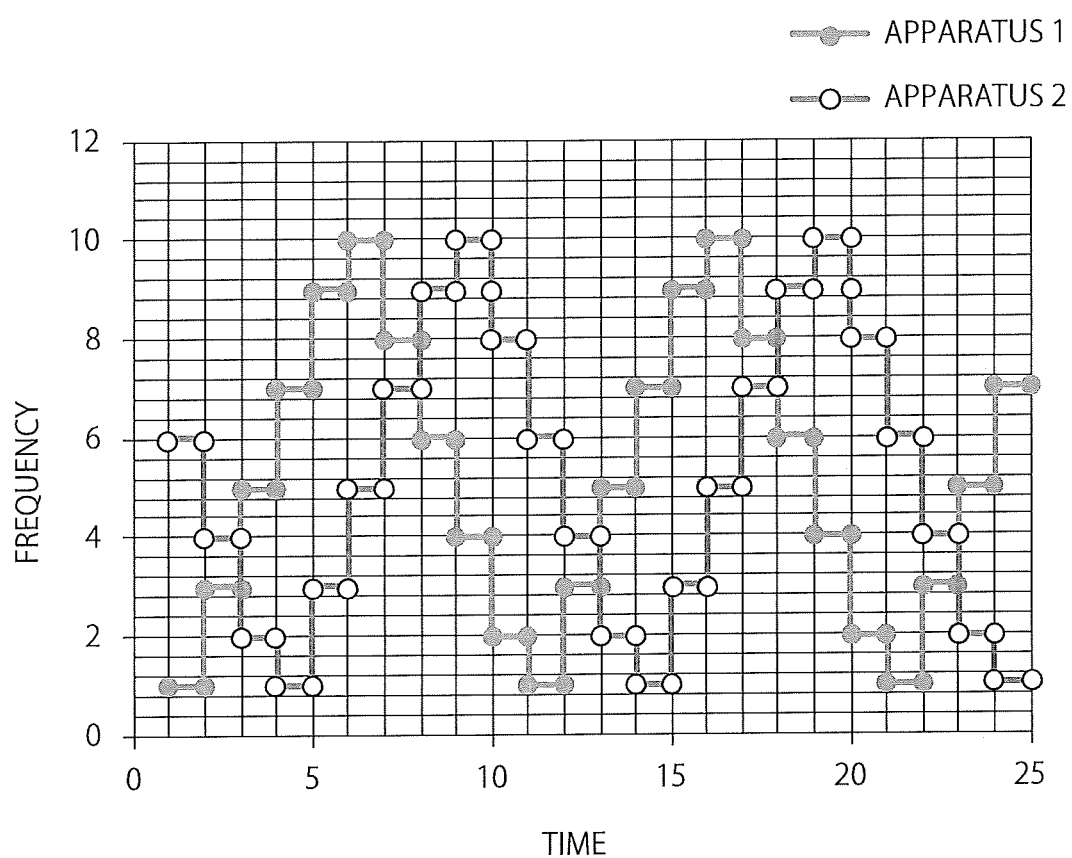
FIG. 5 shows frequency transition of a plurality of power transmission apparatuses.
Figure 6A:
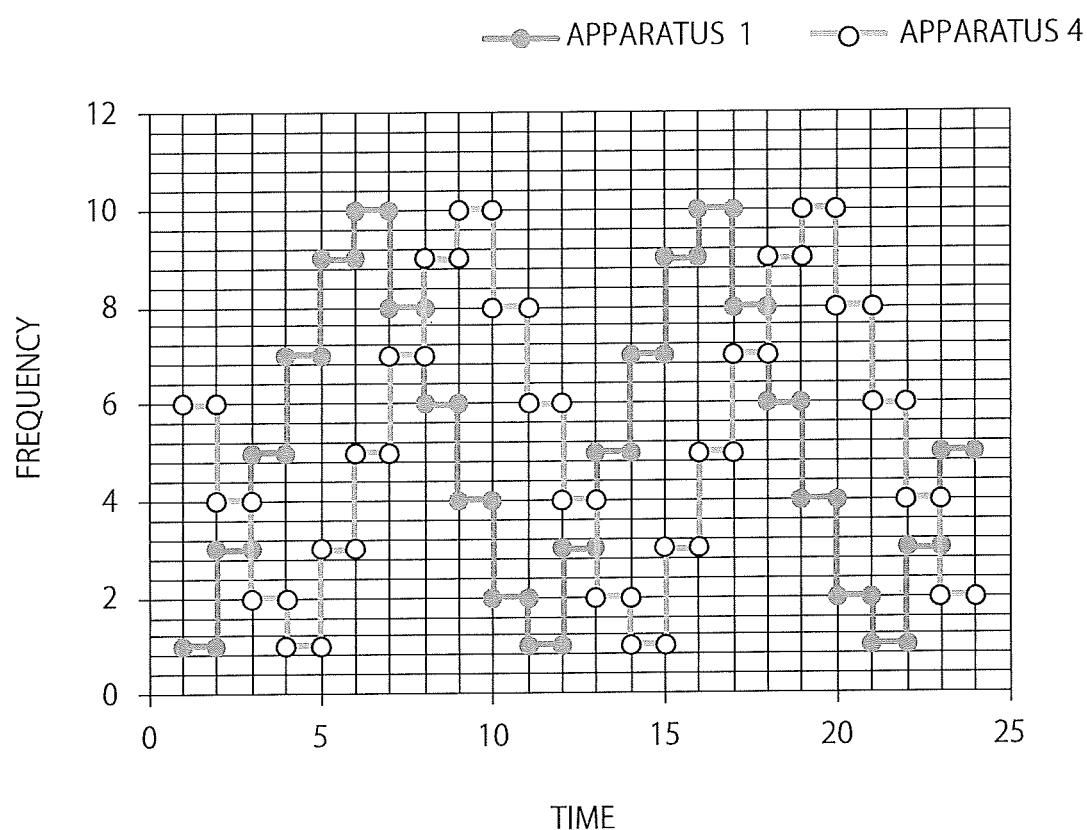
FIG. 6A shows an example of sweep patterns set in two apparatuses among ten power transmission apparatuses.
Figure 6B:
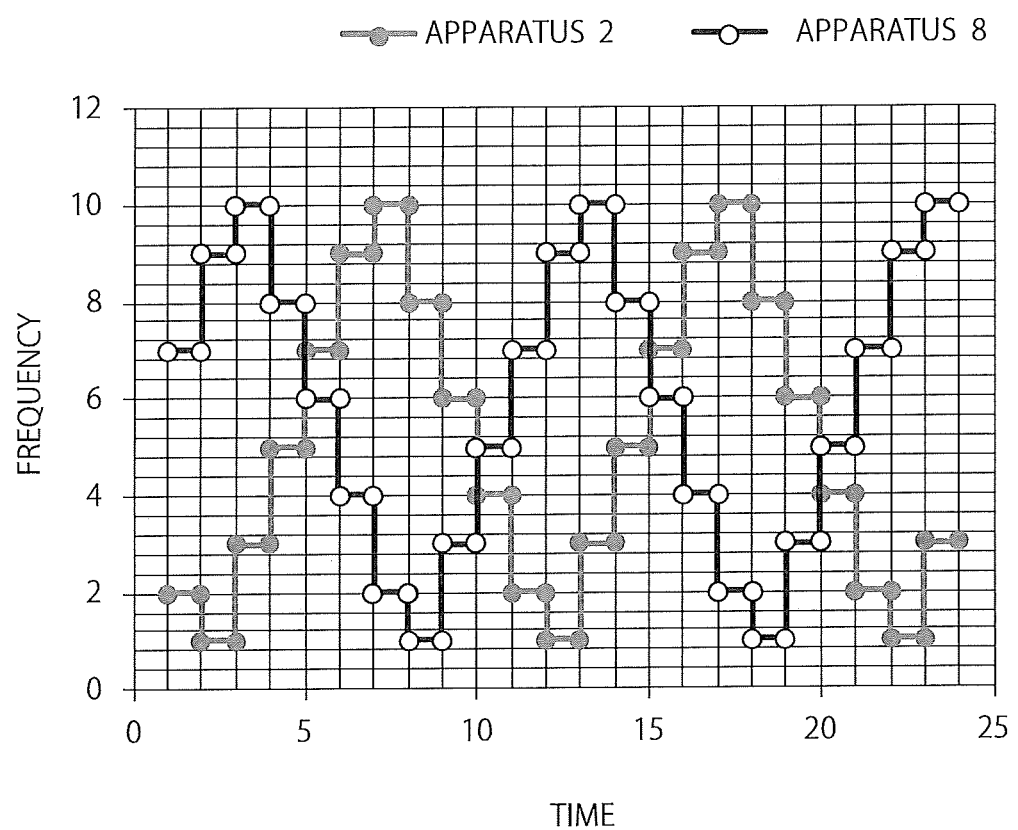
FIG. 6B shows an example of sweep patterns set in other two apparatuses among the ten power transmission apparatuses.
Figure 6C:
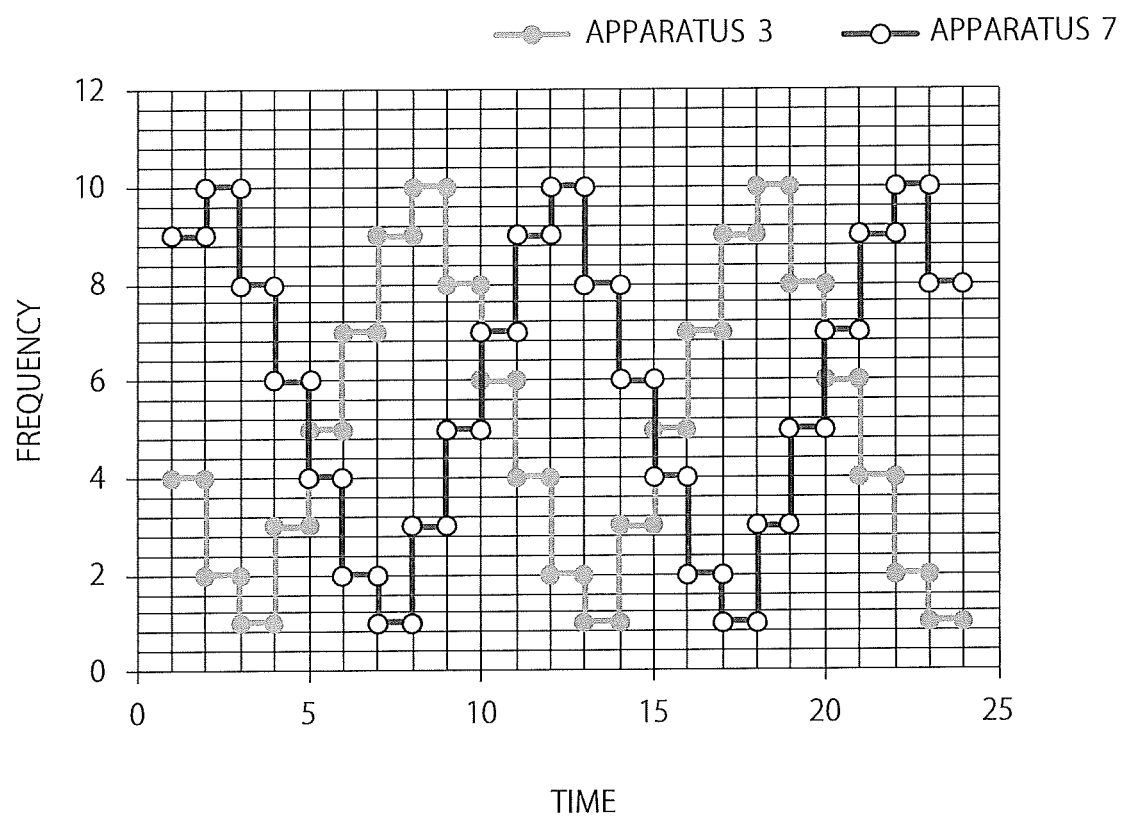
FIG. 6C shows an example of sweep patterns set in still other two apparatuses among the ten power transmission apparatuses.
Figure 6D:
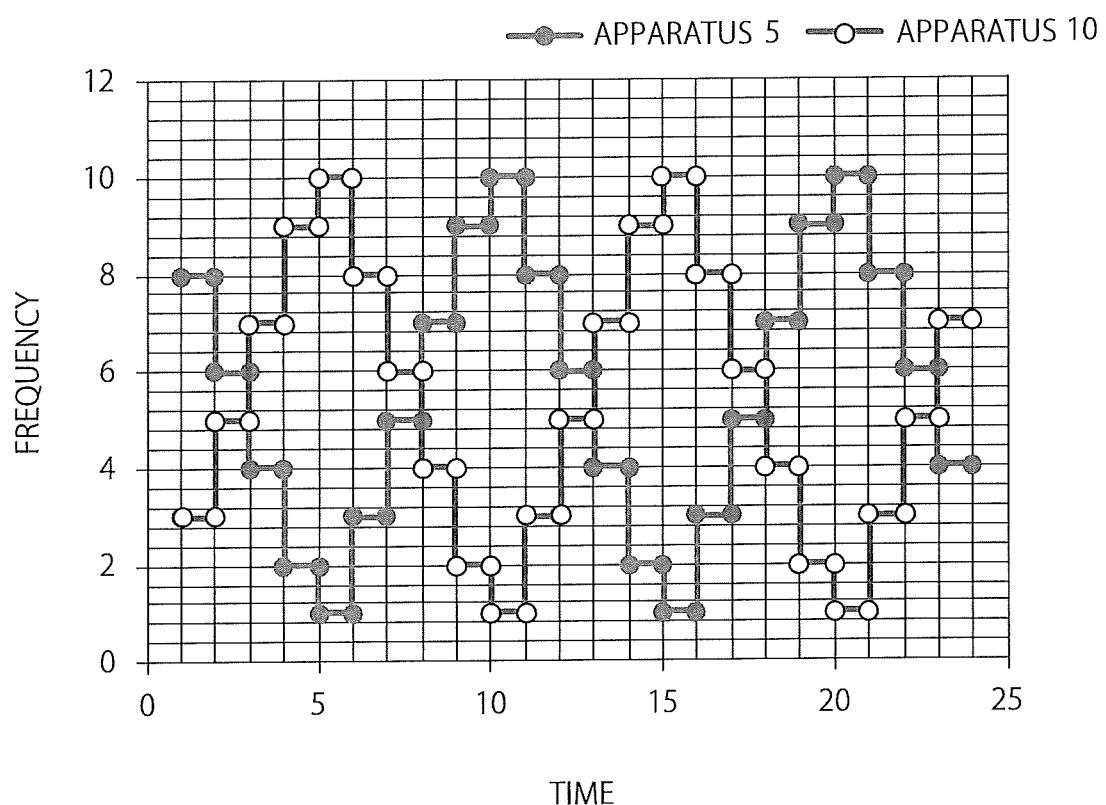
FIG. 6D shows an example of sweep patterns set in yet other two apparatuses among the ten power transmission apparatuses.
Figure 6E:
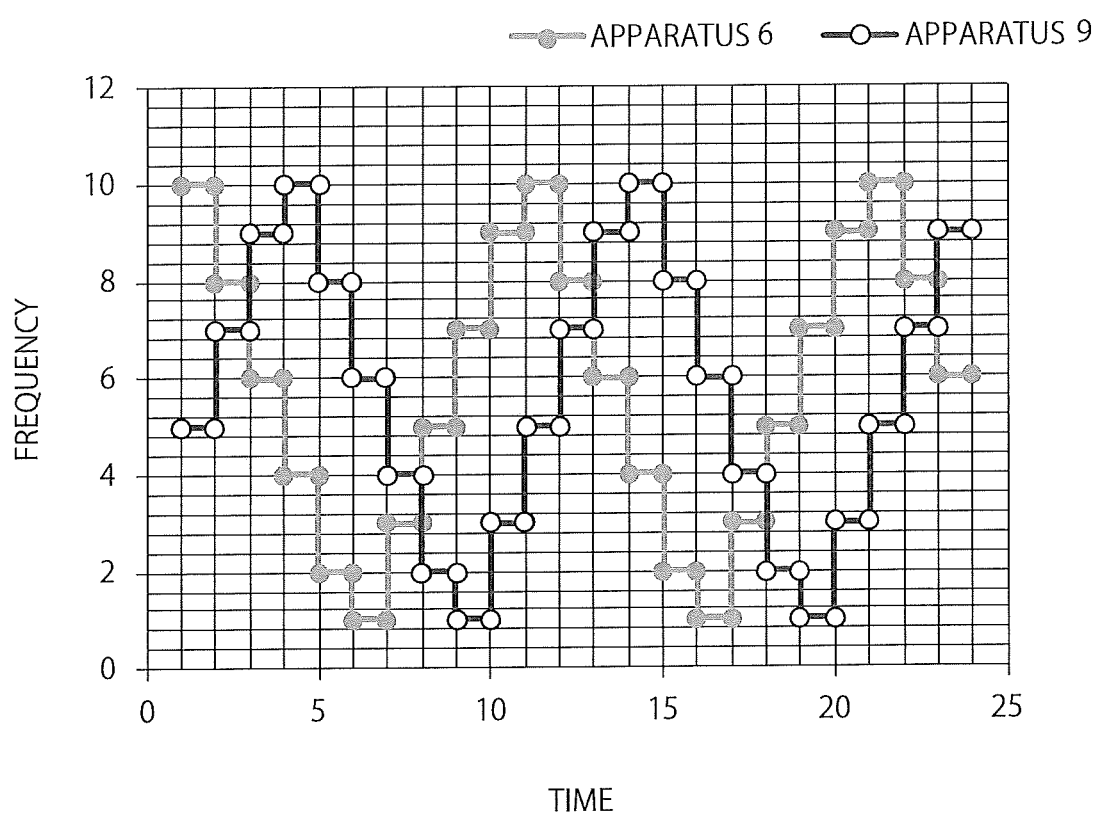
FIG. 6E shows an example of sweep patterns set in the remaining two apparatuses among the ten power transmission apparatuses.

FIG. 5 shows frequency transition of the power transmission apparatus 11A (apparatus 1) and the power transmission apparatus 11B (apparatus 2) in temporal cycles. The abscissa axis represents the time. The ordinate axis represents frequencies "f1," "f2," "f3," "f4," "f5," "f6," "f7," "f8," "f9" and "f10" arranged at regular intervals. The frequency stepwisely increases from "f1" to "f10." That is, "f1" is the minimum and "f10" is the maximum. The power transmission apparatus 11A and the power transmission apparatus 11B transmit power, with the sweep temporal cycles being synchronized with each other. That is, the frequency transition timing and the time period of power transmission at each frequency after transition are the same between the power transmission apparatuses.

The power transmission apparatus 11A uses, as the sweep pattern, a pattern (called a sweep pattern A) sweeping the frequency in the order of "f1," "f3," "f5," "f7," "f9," "f10," "f8," "f6," "f4" and "f2." The power transmission apparatus 11A adopts time "1" as the power transmission start time, and causes the frequency to transition at temporal cycle length "1" according to the sweep pattern A. The sweep and power transmission in conformity with the sweep pattern A are repeated at least once or plural times. The power transmission apparatus 11A thus transmits power using frequency diffusion. Here, the sweep pattern A designates the sweep order using frequencies "f1" to "f10" one time for each. The same frequency is not redundantly used. That is, each frequency is uniformly used. Accordingly, the average transmission power in a unit time period can be effectively reduced, which can also reduce the intensity of radiated emission.

Here, for example, the sweep pattern A is created as described below. Every other frequencies are selected from among "f1" to "f10" (i.e., frequencies are selected alternatively from among "f1" to "f10") to form a first frequency group ("f1," "f3," "f5," "f7" and "f9"), and the frequencies belonging to the first frequency group are designated in an ascending order of the frequency. Subsequently, frequencies other than those in the first frequency group are selected from among the frequencies "f1" to "f10" to form a second frequency group ("f2," "f4," "f6," "f8" and "f10"), and the frequencies belonging to the second frequency group are designated in a descending order of the frequency. The sweep pattern A is thus created.

A sweep using the first frequency group is called an up sweep that increases the frequency. A sweep using the second frequency group is called a down sweep that reduces the frequency. Here, the sweep pattern A is a pattern that sequentially performs the up sweep, which sequentially sweeps the gradually increasing frequencies, and the down sweep, which sequentially sweeps the gradually decreasing frequencies. Accordingly, the change in frequency can be smooth, which can in turn smooth the change in power charge current in the power reception apparatus, as described later. Furthermore, the frequency may transition at a certain temporal cycle. Accordingly, the frequency can be swept by simple control.

The power transmission apparatus 11B uses, as the sweep pattern, a pattern (called a sweep pattern B) sweeping the frequency in the order of "f6," "f4," "f2," "f1," "f3," "f5," "f7," "f9," "f10" and "f8." The power transmission apparatus 11B repeats the frequency sweep and power transmission in conformity with the sweep pattern B at least once or plural times. The power is thus transmitted using frequency diffusion. The sweep pattern B designates the sweep order using frequencies "f1" to "f10" one time for each. The same frequency is not redundantly used.

The sweep pattern B is created by cyclically shifting the position of frequency according to the sweep pattern A, for example. For example, the position of each frequency in the sweep pattern A is shifted to the left by six. The shift moves the leftmost frequency to the rightmost. Accordingly, "f6" is positioned at the beginning. The pattern at this time coincides with the sweep pattern B. Here, the shifting amount is six. However, the shifting amount may be any value in a range between one to nine, inclusive. The sweep pattern B obtained by shifting the sweep pattern A has the frequency positions completely different from those in the sweep pattern A, and has a relatively identical sweep order. Consequently, the power transmission apparatus 11A and the power transmission apparatus 11B sweep the frequency in the same relative order, but do not use the same frequency in the same temporal cycle. The sweep and power transmission using the sweep pattern B can obtain advantageous effects analogous to those described with the aforementioned sweep pattern A.

As described above, the temporal cycles in which the frequencies of the two power transmission apparatuses 11A and 11B transition are the same as each other. The two power transmission apparatuses cause the frequency to transition at the same timing. The power transmission frequency in each temporal cycle is different between the power transmission apparatuses 11A and 11B. Consequently, even when the power transmission apparatuses 11A and 11B simultaneously transmit power through frequency diffusion, radiated emission are prevented from being mutually enhanced.

According to a modified example, the order of frequencies designated from the first frequency group may be in a descending order, while the order of frequencies designated from the second frequency group may be in an ascending order. In this case, the sweep pattern A is a pattern that sequentially performs a down sweep and an up sweep. The sweep pattern B is a pattern obtained by cyclically shifting the sweep pattern. Accordingly, the pattern is what sequentially performs a down sweep and an up sweep in the similar manner.

As described above, by cyclically shifting the sweep pattern that designates the sweep order through use of a plurality of frequencies only one time for each, the sweep pattern that does not use the frequency at the same position (temporal cycle) as that of the sweep pattern concerned, can be obtained. Shifting can be performed as many as "the number of frequencies included in the sweep pattern −1" times. Accordingly, for example, shifting of a certain sweep pattern serving as a reference can create sweep patterns, including the reference pattern, which have mutually different frequency positions and has the same relative sweep order, the patterns being as many as the number of frequencies included in the sweep pattern. For example, in a case where the number of frequencies used for a sweep pattern is 10, 10 sweep patterns that have mutually different frequency positions and have the same relative order of frequency transition at the maximum can be created.

FIG. 5 shows the setting example of the sweep patterns according to this embodiment in the case of two power transmission apparatuses. A setting example of sweep patterns in a case of three or more power transmission apparatuses is now described.

Referring to FIGS. 6A, 6B, 6C, 6D and 6E, an example of setting sweep patterns in ten power transmission apparatuses is described. FIGS. 6A to 6E each show frequency transition of two power transmission apparatuses. The sweep pattern of the apparatus 1 is the same as the sweep pattern of the apparatus 1 in FIG. 5. The sweep patterns of apparatuses 2 to 9 correspond to those obtained by shifting the sweep pattern of the apparatus 1 by respective different amounts. Each of the sweep patterns of the apparatuses 1 to 10 is a pattern that uses "f1" to "f10" one time for each. However, the frequency in each temporal cycle is different (the relative frequency transition order is the same). For example, in the temporal cycle 1, the apparatus 1 uses the frequency "f1," the apparatus 2 uses the frequency "f2," the apparatus 3 uses the frequency "f4," the apparatus 4 uses the frequency "f6," the apparatus 5 uses the frequency "f8," the apparatus 6 uses the frequency "f10," the apparatus 7 uses the frequency "f9," the apparatus 8 uses the frequency "f7," the apparatus 9 uses the frequency "f5" and the apparatus 10 uses the frequency "f3." Subsequently, the apparatuses 1 to 10 each cause the frequency to transition in the same temporal cycle. The relative frequency transition order is the same. Consequently, the ten power transmission apparatuses are prevented from using the same frequency in the same temporal cycle.

Figure 7:
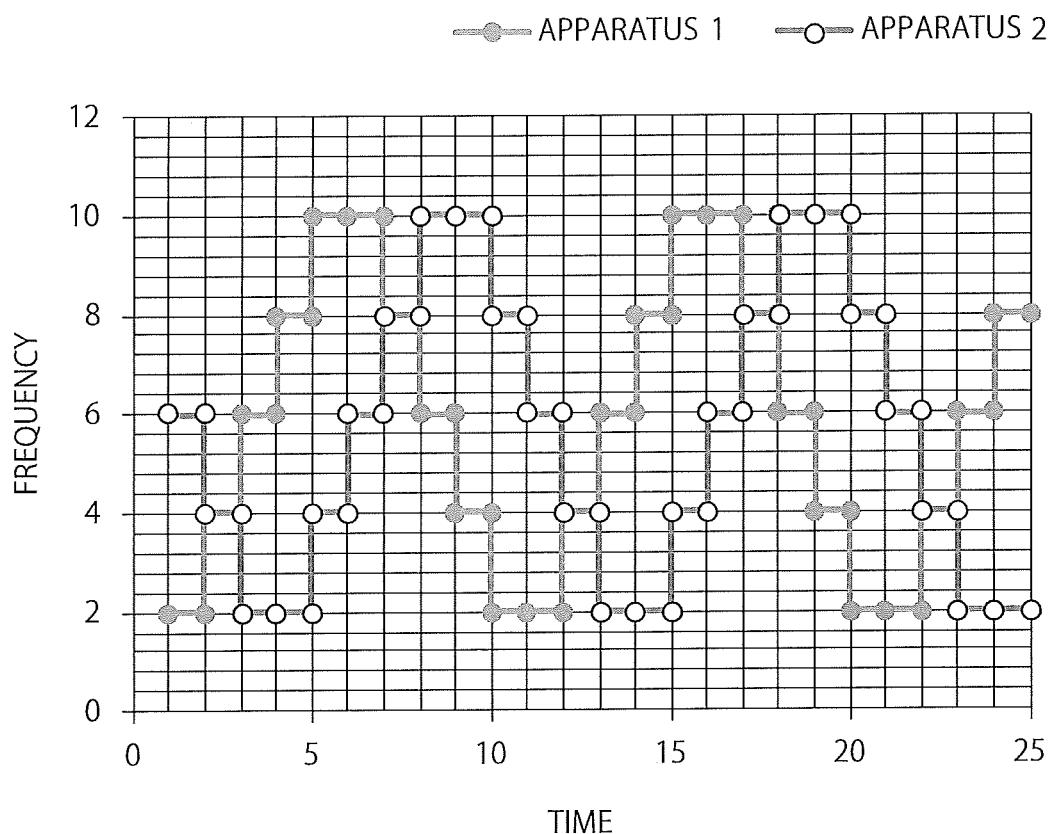
FIG. 7 shows an example of frequency diffusion according to related technology as a comparative example.

FIG. 7 shows an example of frequency diffusion according to related technology as a comparative example. The same frequency is used twice in one sweep pattern. That is, the sweep pattern of the apparatus 1 is "f2," "f4," "f6," "f8," "f10," "f8," "f6," "f4" and "f2." Frequency sweeping in conformity with this sweep pattern is repeated. The sweep pattern of the apparatus 2 is a pattern obtained by shifting the sweep pattern of the apparatus 1, and is "f6," "f4," "f2," "f2," "f4," "f6," "f8," "f10" and "f8." Frequency sweeping in conformity with this sweep pattern is repeated. The sweep pattern of the apparatus 1 and the sweep pattern of the apparatus 2 use the same frequency in some temporal cycles. For example, in the temporal cycles at times "3," "13," "17" and "23," the frequencies of the apparatus 1 and the apparatus 2 overlap with each other. Accordingly, power transmission by the apparatus 1 and the apparatus 2 according to these sweep patterns causes a problem in that radiated emission are mutually enhanced at timing at which the frequencies overlap each other.

Figure 8:
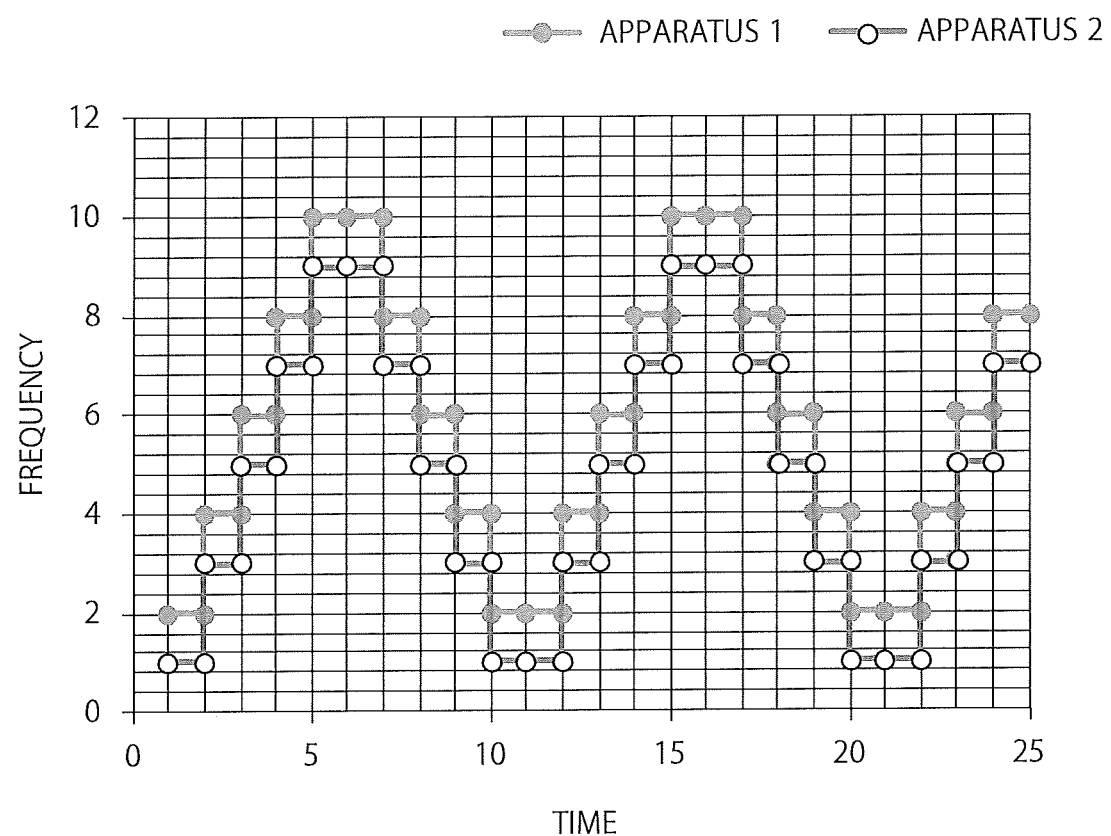
FIG. 8 shows another example of frequency diffusion according to related technology as a comparative example.

FIG. 8 shows another example of frequency diffusion according to related technology as a comparative example. Frequency groups used by the respective two power transmission apparatuses are configured to be different from each other. The sweep pattern of the apparatus 1 is "f2," "f4," "f6," "f8," "f10," "f10," "f8," "f6," "f4" and "f2." The sweep pattern of the apparatus 2 is "f1," "f3," "f5," "f7," "f9," "f9," "f7," "f5," "f3" and "f1." The apparatus 1 and the apparatus 2 use different frequencies in the same temporal cycle. Accordingly, the frequencies of the two power transmission apparatuses do not overlap each other in any temporal cycle. However, if the number of power transmission apparatuses further increases, the third power transmission apparatus and thereafter are required to use the same frequency as that of any of the two sweep patterns. Accordingly, in this case, the frequencies overlap each other in the same temporal cycle between the power transmission apparatuses.

Figure 9:
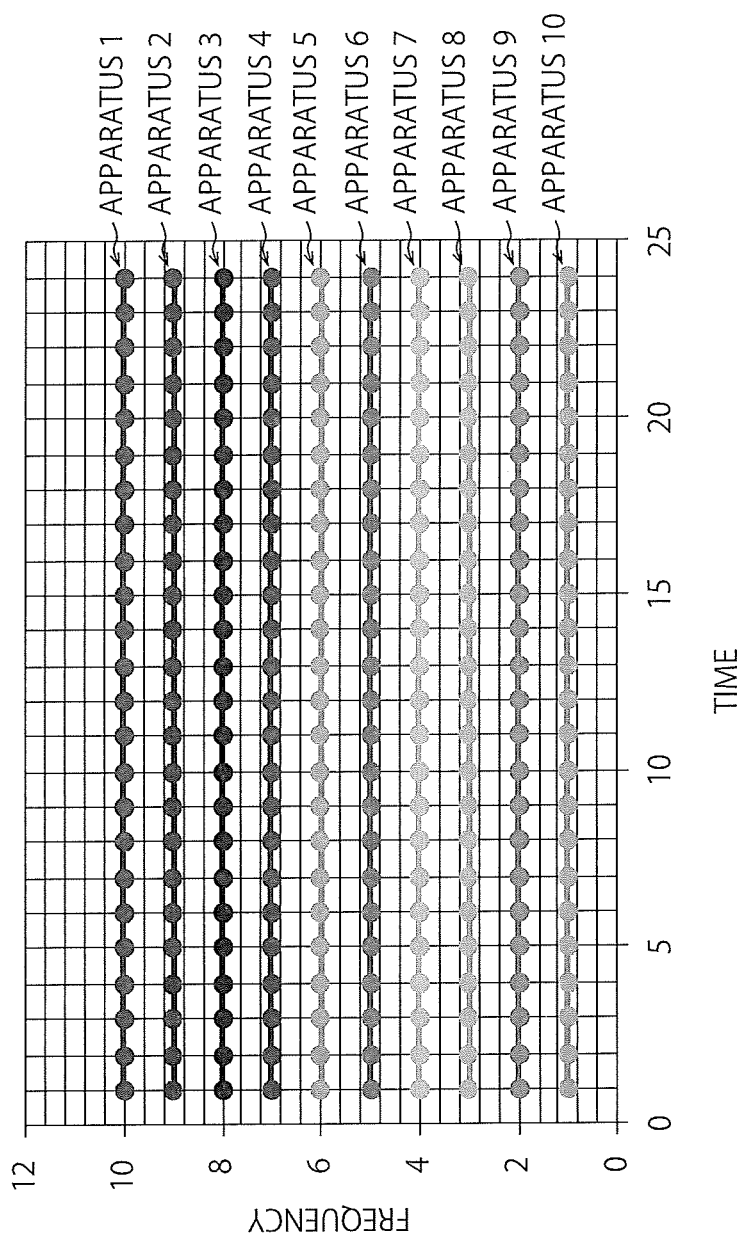
FIG. 9 shows still another example of related technology as a comparative example.

FIG. 9 shows still another example of related technology as a comparative example. This is a case where ten power transmission apparatuses are allowed to use the frequencies "f1" to "f10" separately. Unlike the example in FIG. 9 or 10, each power transmission apparatus does not perform frequency diffusion and continuously uses the same frequency. The frequencies do not overlap each other among the power transmission apparatuses. However, some frequencies have the low power transmission efficiency. Accordingly, inequality occurs among the power transmission apparatuses.

Figure 10:
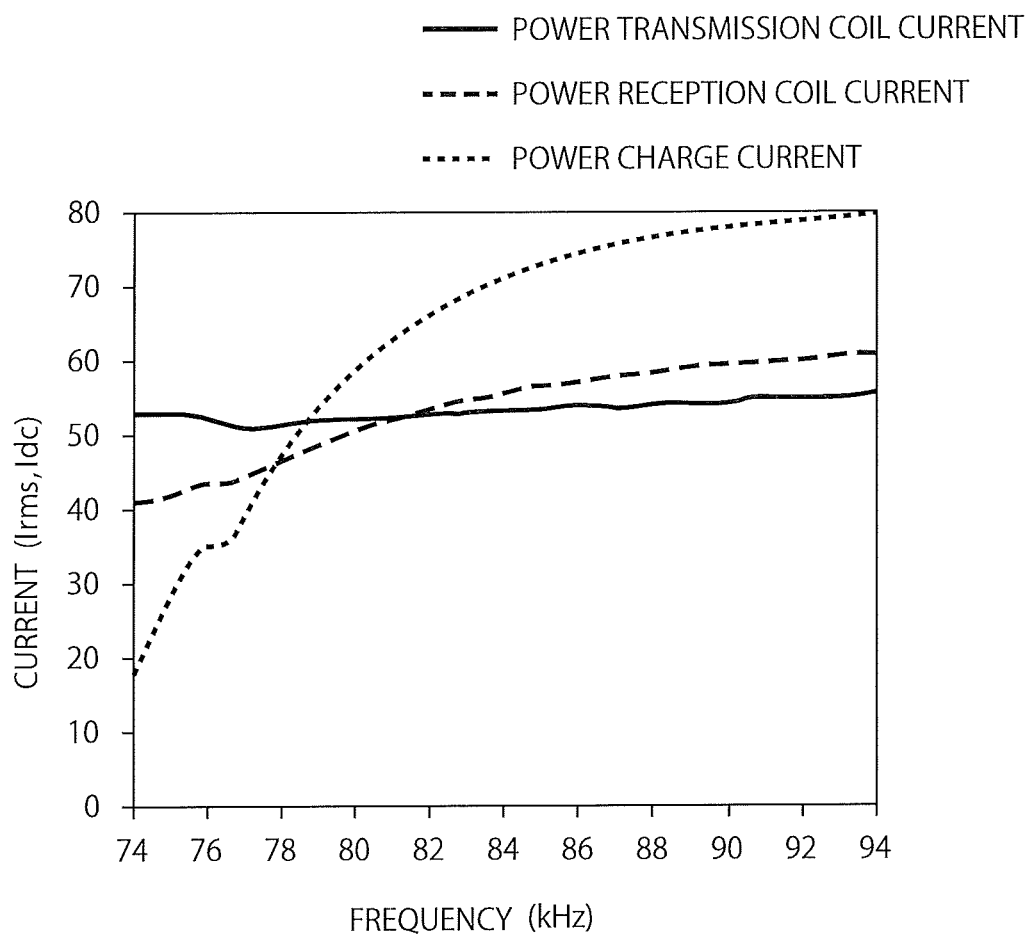
FIG. 10 shows an example of frequency characteristics of current flowing in a power transmission coil and a power reception coil, and power charge current.

FIG. 10 shows an example of the frequency characteristics of current flowing in the power transmission coil of the power transmission apparatus 11, current flowing in the power reception coil of the power reception apparatus 12, and power charge current at the battery 126 of the power reception apparatus 12 according to this embodiment.

For any current, the current value varies according to the frequency. That is, variation in current appears owing to the frequency characteristics. If the frequency transition is randomly determined, there is a possibility that a large variation in frequency appears. In this case, the variation in current becomes large accordingly. On the other hand, according to the sweep pattern exemplified in FIG. 5, the gradually increasing frequencies and the gradually decreasing frequencies are sequentially swept, which can smooth the change in frequency. Consequently, variation in current can be reduced. If a large variation in current can be permitted, a sweep pattern where frequency transition is randomly determined can be adopted. Other sweep patterns may be created by cyclically shifting this sweep pattern.

MODIFIED EXAMPLE 1

Figure 11:
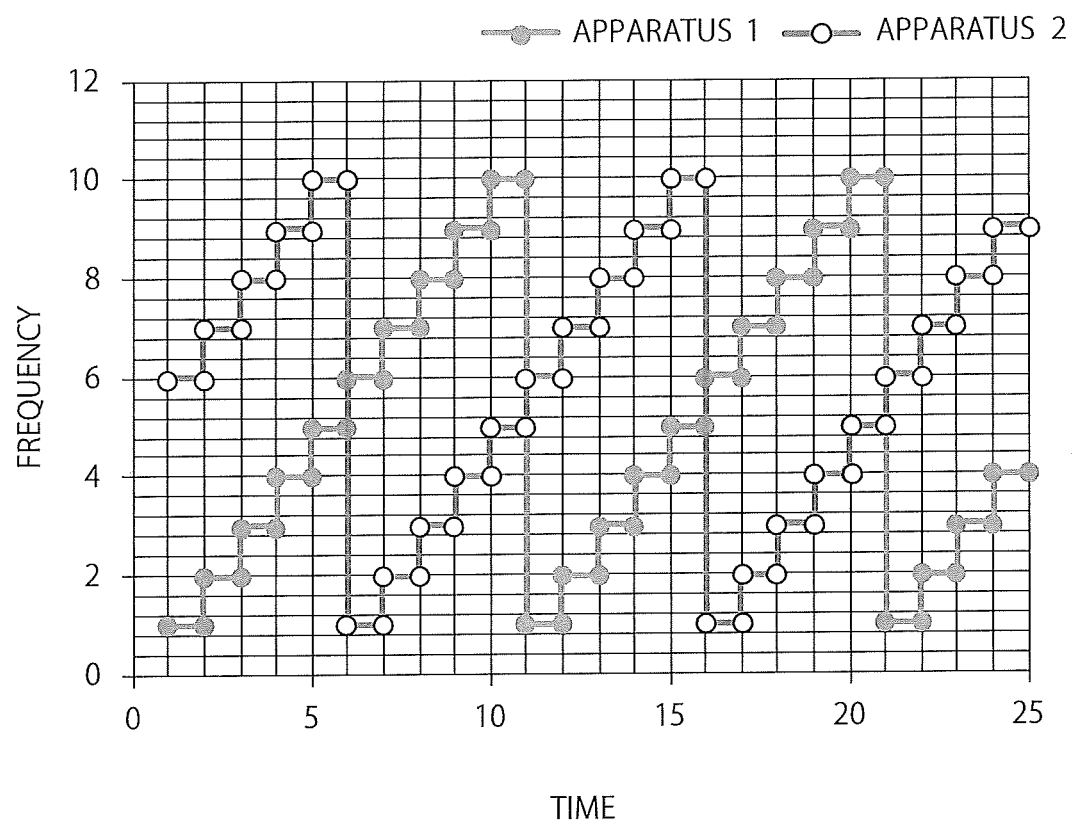
FIG. 11 shows another example of sweep patterns set in a plurality of power transmission apparatuses.

FIG. 11 shows another example of sweep patterns set in the power transmission apparatus 11A (apparatus 1) and the power transmission apparatus 11B (apparatus 2). The sweep pattern (sweep pattern A) of the power transmission apparatus 11A is "f1," "f2," "f3," "f4," "f5," "f6," "f7," "f8," "f9" and "f10." The sweep pattern (sweep pattern B) of the power transmission apparatus 11B is "f6," "f7," "f8," "f9," "f10," "f1," "f2," "f3," "f4" and "f5." The sweep pattern B is obtained by cyclically shifting the sweep pattern A to the left by five frequency units. According to the sweep pattern A, the frequency smoothly changes from "f1" to "f10" but largely changes from "f10" to "f1." Also according to the sweep pattern B, the frequency largely changes from "f10" to "f1." The large variation in frequency occurs at one place as described above. However, the power transmission apparatus 11A and the power transmission apparatus 11B do not use the same frequency in the same temporal cycle. Consequently, the intensity of radiated emission can be reduced. Here, the example of two power transmission apparatuses has been described. Sweep patterns where the frequencies transition in the same relative order but the frequencies do not overlap in the same temporal cycle can be created for ten power transmission apparatuses at the maximum.

MODIFIED EXAMPLE 2

Figure 12:
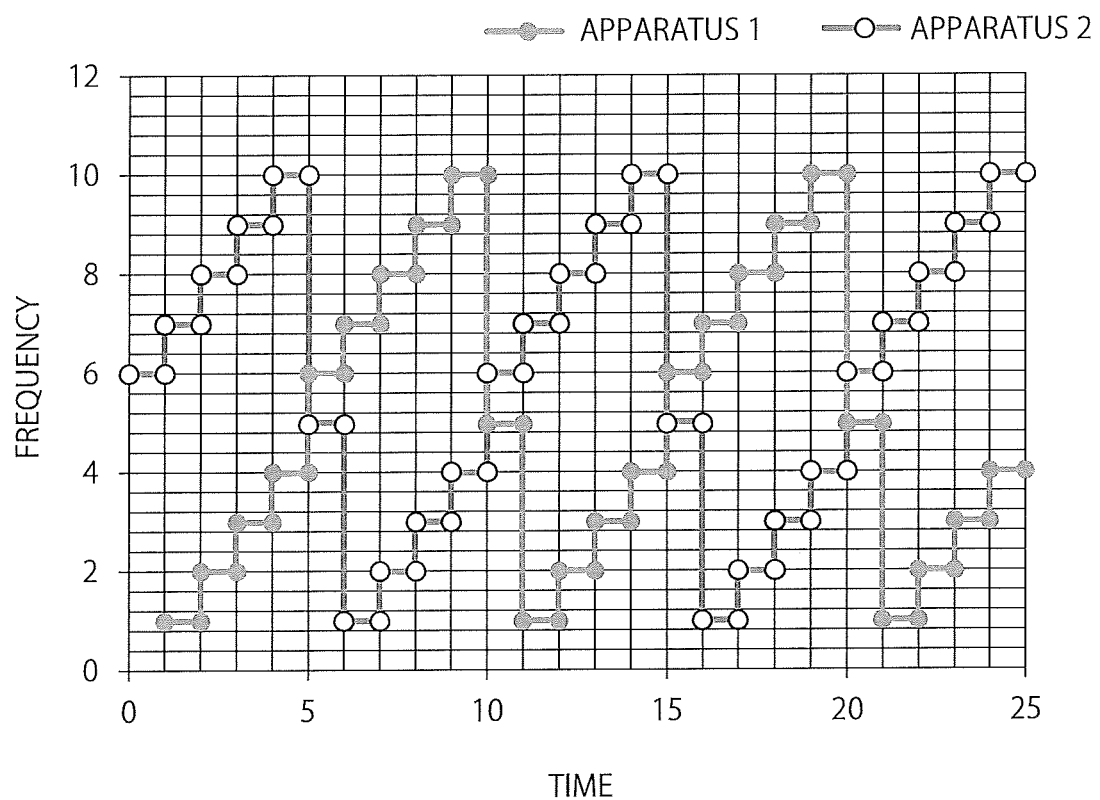
FIG. 12 shows still another example of sweep patterns set in a plurality of power transmission apparatuses.

FIG. 12 shows another example of sweep patterns set in the power transmission apparatus 11A (apparatus 1) and the power transmission apparatus 11B (apparatus 2). The sweep pattern (sweep pattern A) of the power transmission apparatus 11A is "f1," "f2," "f3," "f4," "f6," "f7," "f8," "f9," "f10" and "f5." The sweep pattern (sweep pattern B) of the power transmission apparatus 11B is "f6," "f7," "f8," "f9," "f10," "f5," "f1," "f2," "f3" and "f4." The sweep pattern B is obtained by cyclically shifting the sweep pattern A to the left by four frequency units. According to the sweep pattern A, the frequency smoothly changes from "f1" to "f10" but largely changes in transition from "f10" to "f5" and in transition from "f5" to "f1." Also according to the sweep pattern B, the frequency largely changes in transition from "f10" to "f5" and in transition from "f5" to "f1." The medium variations in frequency occur at two places as described above. However, the variation widths are smaller than the example shown in FIG. 11. Consequently, the variation in frequency of each type of current can also be reduced. The power transmission apparatus 11A and the power transmission apparatus 11B do not use the same frequency in the same temporal cycle. Consequently, the intensity of radiated emission can be reduced. Here, the example of two power transmission apparatuses has been described. Sweep patterns where the frequencies transition in the same relative order but the frequencies do not overlap in the same temporal cycle can be created for ten power transmission apparatuses at the maximum.

(Adjustment of the Number of Frequencies According to the Number of Power Transmission Apparatuses)

In this embodiment, according to the number of power transmission apparatuses, the number of frequencies used for frequency sweeping (the number of frequencies included in the sweep pattern) may be varied. For example, the more the number of power transmission apparatuses becomes, the more the number of frequencies is increased. The less the number of power transmission apparatuses becomes, the less the number of frequencies is reduced. For example, it is preferable that the number of frequencies be equal to or more than the number of power transmission apparatuses. In this case, the power transmission apparatuses can use different sweep patterns (sweep patterns where the frequencies do not overlap in the same temporal cycle but the frequency sweep orders are relatively identical). Accordingly, the frequencies can be prevented from being overlap at the same time. Consequently, reduction in transition of frequencies used for frequency diffusion can prevent the intensity of radiated emission from increasing, and reduce the adverse effects of the frequency characteristics on power charge current or the like.

The control circuit of each power transmission apparatus grasps the number of power transmission apparatuses residing therearound, by mutual communication via the communication circuit, or by carrier detection. Based on the grasped number of apparatuses, the number of frequencies is determined, and the sweep pattern including the determined number of frequencies is used. The sweep pattern that does not overlap the patterns of the other power transmission apparatuses may be identified through communication with the other power transmission apparatuses, as described above. Alternatively, a control apparatus that manages a plurality of power transmission apparatuses may be arranged. The control apparatus may detect the number of power transmission apparatuses, and determine the number of frequencies. In this case, the control apparatus transmits information on the determined number to each power transmission apparatus. Alternatively, the control apparatus may determine the sweep pattern to be used by each power transmission apparatus, on the basis of the number, and transmit the information on the determined sweep pattern to the corresponding power transmission apparatus.

(Another Configuration Example of Power Transmission Apparatus)

Figure 13:
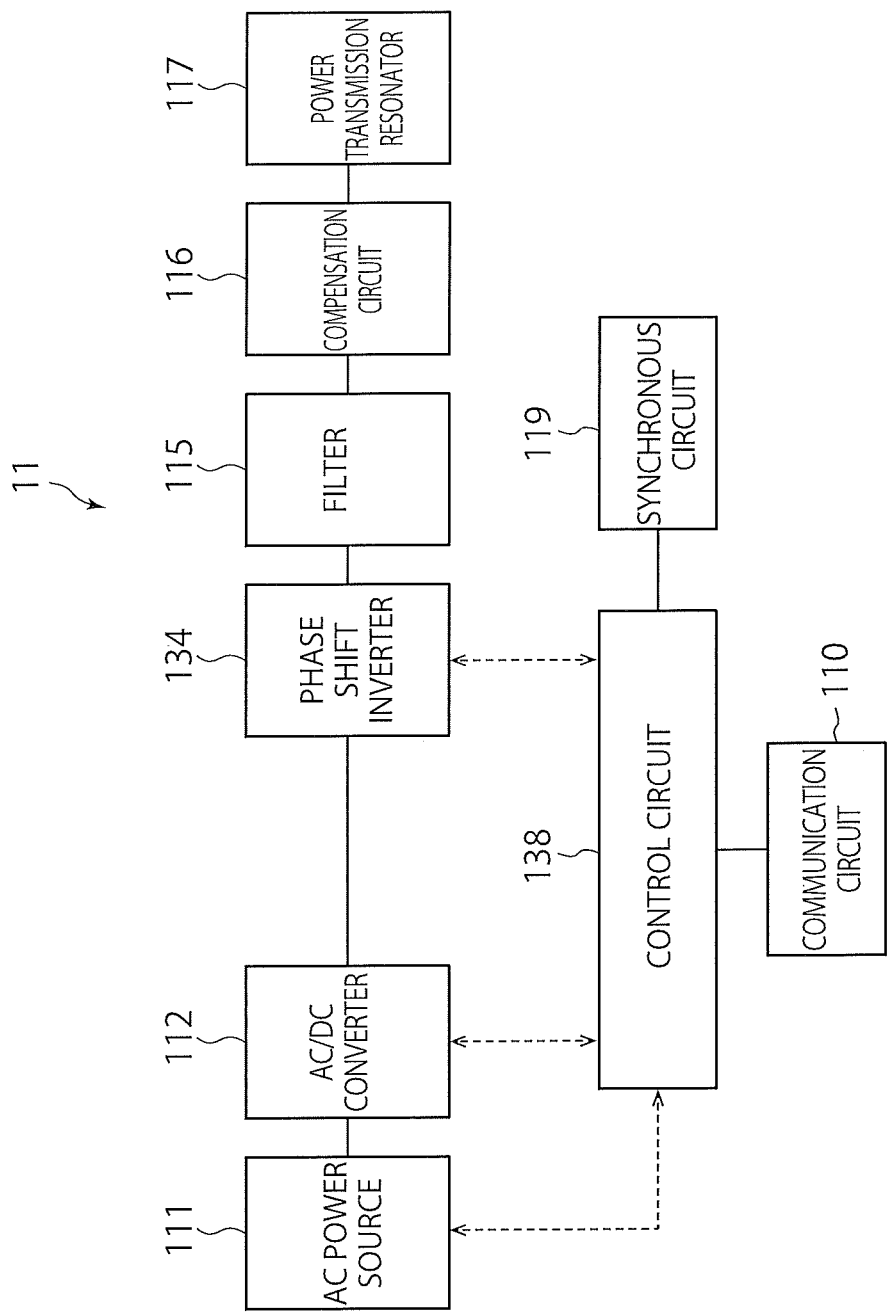
FIG. 13 shows another configuration example of the power transmission apparatus according to this embodiment.
Figure 14:
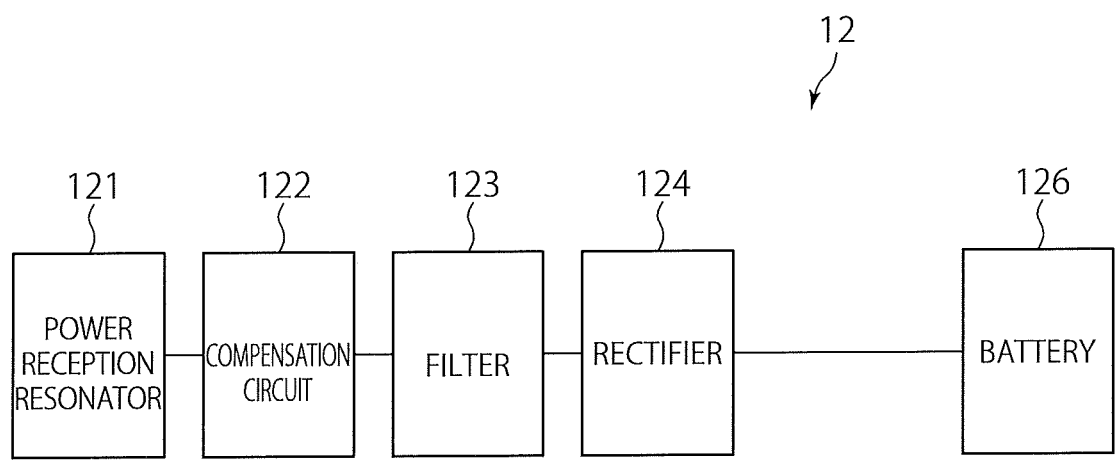
FIG. 14 shows another configuration example of the power reception apparatus according to this embodiment.

FIG. 13 shows another configuration example of the power transmission apparatus 11 according to this embodiment. FIG. 14 shows another configuration example of the power reception apparatus 12 according to this embodiment. The power reception apparatus 12 in FIG. 14 receives power transmitted from the power transmission apparatus 11 in FIG. 13. In FIG. 13, instead of the DC/DC converter 113 and the inverter 114 in FIG. 1, a phase shift inverter 134 is added. In FIG. 13, the control circuit 118 in FIG. 1 is replaced with a control circuit (control circuitry) 138. The power reception apparatus 12 in FIG. 14 corresponds to the power reception apparatus 12 in FIG. 4 from which the DC/DC converter 125 is removed.

The phase shift inverter 134 can convert the DC voltage of the AC/DC converter 112 into AC power, and change the voltage of the AC power to be output. The phase shift inverter 134 is, for example, a full bridge inverter that includes a plurality of switching elements. The control circuit 138 adjusts the output voltage of the AC/DC converter 112 by adjusting the phase amount of a switching signal for driving each switching element. This adjustment can, in turn, adjust the power charge current in the power reception apparatus 12. The control circuit 138 can adjust the frequency of the output current by adjusting the cycle (the number of pulse repetitions per unit time period) of driving each switching signal.

As described above with reference to FIG. 10, frequency diffusion causes a variation in frequency of power charge current. However, by adjusting the phase amount of each switching element with respect to each of frequency-diffused frequencies, the variation in power charge current can be reduced. For example, the power charge current is allowed to be constant. In this case, through a preliminary experiment or simulation, the phase amount of each switching element required to reduce the variation in power charge current is calculated with respect to each of the frequencies to be frequency-diffused. Information that associates the frequency with the calculated phase amount is stored in a storage device (not shown) accessible from an internal buffer of the control circuit 138 or the control circuit 138. During frequency diffusion, the control circuit 138 identifies the phase amount of each switching element in accordance with the frequency, on the basis of the information, and adjusts the phase amount of each switching element.

In the power reception apparatus 12 in FIG. 14, the battery 126 is charged with the DC power output from the rectifier 124. The voltage is appropriately adjusted in the power transmission apparatus 11. Accordingly, no DC/DC converter is arranged in the power reception apparatus 12. Alternatively, a DC/DC converter can be arranged in the power reception apparatus 12.

Figure 15:
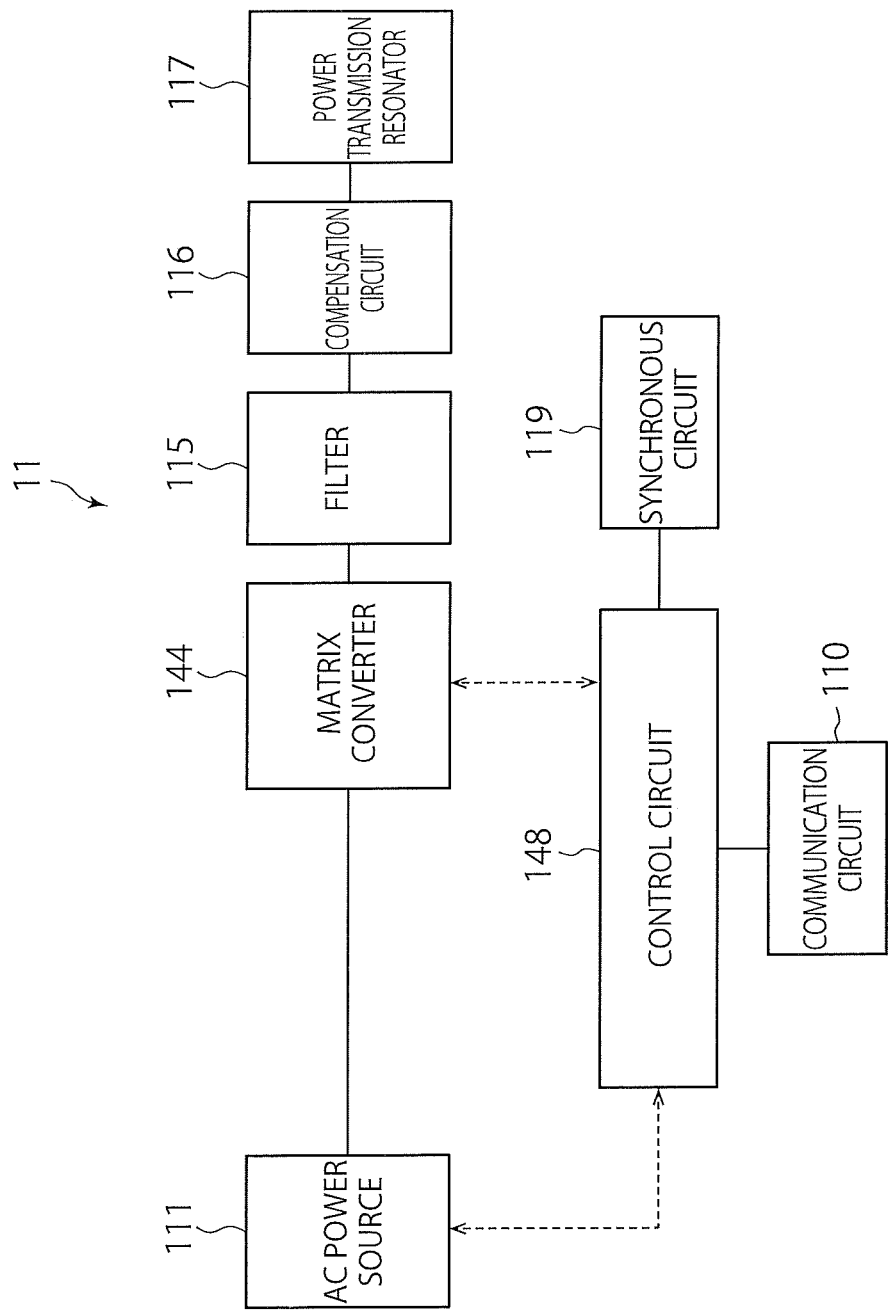
FIG. 15 shows still another configuration example of the power transmission apparatus according to this embodiment.

FIG. 15 shows still another configuration example of the power transmission apparatus 11 according to this embodiment. The configuration of the power reception apparatus that receives power transmitted from the power transmission apparatus 11 in FIG. 15 is the same as that in FIG. 14, for example. In FIG. 15, instead of the AC/DC converter 112 and the phase shift inverter 134 in FIG. 13, a matrix converter 144 is added.

The matrix converter 144 is a power converter device that directly generates an AC power having a new frequency from an AC power source (three-phase power source). A plurality of switches arranged in a matrix manner are included. By controlling these switches, an AC power having any frequency and voltage value can be generated. A control circuit (controlling circuitry) 148 generates a control signal for each switch, thereby controlling the corresponding switch. Accordingly, similar to the power transmission apparatus in FIG. 13, in the case of frequency diffusion, the variation in power charge current can be reduced. Adoption of the matrix converter can reduce the size of the apparatus.

For example, the wireless power transfer system according to this embodiment can be used for a case of charging a battery-mounted electric vehicle (EV), an electric bus, an electric industrial vehicle, an electric train and the like in a non-contact manner. When a plurality of vehicles are charged at the same time, the power is transmitted from each power transmission apparatus through frequency diffusion while the same frequency is not used by each power transmission apparatus in the same temporal cycle. Accordingly, the average transmission power in a unit time period can be effectively reduced, which can also reduce the radiated emission.

Furthermore, this embodiment is also effective for usages other than the usage of battery charging. For example, in a power conversion station that includes a plurality of DC/AC converter devices, and a system accompanied by control of a plurality of motors, use of the technology of this embodiment can reduce the radiated emission. The reduction effect can be expected also for conducted disturbance.

Second Embodiment

As described in the first embodiment, by cyclically shifting the sweep pattern, the other sweep patterns that do not have the same frequency in the same temporal cycle can be generated. The sweep patterns that do not have the same frequency in the same temporal cycle can be created as many as the number of frequencies included in the sweep pattern, at the maximum. Consequently, if the number of power transmission apparatuses exceeds the number of frequencies, a plurality of power transmission apparatuses may possibly use the same sweep pattern.

For example, by cyclically shifting the sweep pattern of the power transmission apparatus 11A (apparatus 1) shown in FIG. 5, total 10 sweep patterns that do not have the same frequency in the same temporal cycle can be obtained at the maximum. If the number of power transmission apparatuses is up to 10, each power transmission apparatus uses the thus generated sweep pattern, which prevents the same frequency from being used at the same time. That is, if the number of power transmission apparatuses equal to or is less than the number of sweep patterns, the power transmission apparatuses use the sweep patterns different from each other. However, if the number of power transmission apparatuses is 11 or more, the same sweep pattern is used by at least two power transmission apparatuses.

If the number of power transmission apparatuses is larger than the number of sweep patterns as described above, it is preferable that the sweep patterns of the power transmission apparatuses be determined such that the number of power transmission apparatuses using the same sweep pattern is the minimum or equal to or less than a threshold (first method). Accordingly, the mutual enhancement of radiated emission can be alleviated.

Alternatively, the sweep patterns used by the respective power transmission apparatuses are determined such that the power transmission apparatuses that use the same frequency at the same time reside at positions apart from each other as much as possible (second method). For example, the sweep patterns of the power transmission apparatuses are determined such that the distance between the power transmission apparatuses using the same sweep pattern is larger than each of the distances between the power transmission apparatuses using the different sweep patterns. Accordingly, the mutual enhancement of radiated emission can be alleviated. The first method and the second method may be executed at the same time.

According to a specific example of the second method, the power transmission apparatus detects the sweep patterns used by the other power transmission apparatuses that are transmitting the power. If the number of all the other power transmission apparatuses is equal to or more than the number of sweep patterns and all the sweep patterns have already been used, the apparatus concerned identifies a power transmission apparatus whose distance from the apparatus concerned is the largest or equal to or more than the threshold. The same sweep pattern as that of the identified power transmission apparatus is determined as the sweep pattern of the apparatus concerned. The apparatus concerned may communicate with each power transmission apparatus, obtain information on the position and information on the sweep pattern in use, and identify the position of the other power transmission apparatus and the sweep pattern in use using the obtained pieces of information. Alternatively, the position may be estimated about the other power transmission apparatus through distance estimation using radio waves. Alternatively, a control apparatus that manages each power transmission apparatus may be installed, and the control apparatus may determine the sweep pattern to be used by each power transmission apparatus based on the position of the corresponding power transmission apparatus, and notify the determined sweep pattern to the corresponding power transmission apparatus.

If a plurality of power transmission apparatuses use the same sweep pattern, the phase difference of AC current transmitted from the power transmission apparatuses may be controlled such that the radiated emission emitted from the power transmission apparatuses at least partially cancel each other. For example, if two power transmission apparatuses use the same sweep pattern, the phase of current is controlled by the control circuit of each power transmission apparatus such that the radiated emission are in opposite phase and the power transmission currents of the two power transmission apparatuses are in opposite phases (phase difference of 180 degrees). If three power transmission apparatuses use the same sweep pattern, the phases of currents are controlled by the control circuits of the respective power transmission apparatuses such that the power transmission currents of these power transmission apparatuses have a phase difference of 120 degrees. Accordingly, the radiated emission cancel each other, which can reduce the radiated emission.

For example, the power transmission apparatuses negotiate with each other, and determine the phases of currents to be used by the respective apparatuses. When, during power transmission by a power transmission apparatus, another power transmission apparatus newly starts power transmission, the power transmission apparatus concerned may change the phase of current in midstream. For example, when, a power transmission apparatus newly participates during two power transmission apparatuses generating the power transmission currents and transmitting the power in opposite phase, the phases of the power transmission currents are determined such that the three power transmission apparatuses each have a phase difference of 120 degrees. Alternatively, a control apparatus that manages each power transmission apparatus may be installed, and the control apparatus may determine the sweep pattern to be used by each power transmission apparatus and the phase of power transmission current, and notify the determined sweep pattern and the phase of power transmission current to the corresponding power transmission apparatus. Note that the value of 180 or 120 degrees is not necessarily strictly adopted as such a value. The phases are only required to deviate from each other to an extent where the magnetic field cancelling effect can be achieved. For example, it is only required to have a phase difference in a range of ±30 degrees with respect to 180 or 120 degrees.

Third Embodiment

In the first embodiment, the example of charging the battery of the electric vehicle through wireless power transfer has been described. Alternatively, the power of the electric vehicle is transmitted to another electric vehicle, a home or a grid in some cases. In such cases, the power reception apparatus in the vehicle also has the function of the power transmission apparatus, and the power transmission apparatus installed in a parking facility has the function of the power reception apparatus.

For example, in a parking facility allowing a plurality of vehicles to park, wireless power transfer for charging a certain electric vehicle (vehicle A) from the power transmission apparatus on the parking facility side, and wireless power transfer for transferring the power of another electric vehicle (vehicle B) to still another electric vehicle (vehicle C), a home or a grid are simultaneously performed in some cases. Also in such cases, the power transmission apparatus on the parking facility side, and the power transmission apparatus in the vehicle B use the sweep patterns described in the first embodiment, which can reduce the radiated emission.

To achieve bidirectional wireless power transfer that allows the electric vehicle to be charged by the power transmission apparatus in the parking facility, and allows the vehicle concerned to transfer power to another party, the electric vehicle is required to have not only the power reception function but also the power transmission function. In this case, in addition to the power reception apparatus in the first or second embodiment, the power transmission apparatus is added to the electric vehicle, and the power charged in the battery is transmitted from the power transmission apparatus. In this case, the resonator may be shared between the power transmission apparatus and the power reception apparatus. This negates the need to mount the coil redundantly, which can facilitate to reduce the weight of the vehicle.

Figure 16:
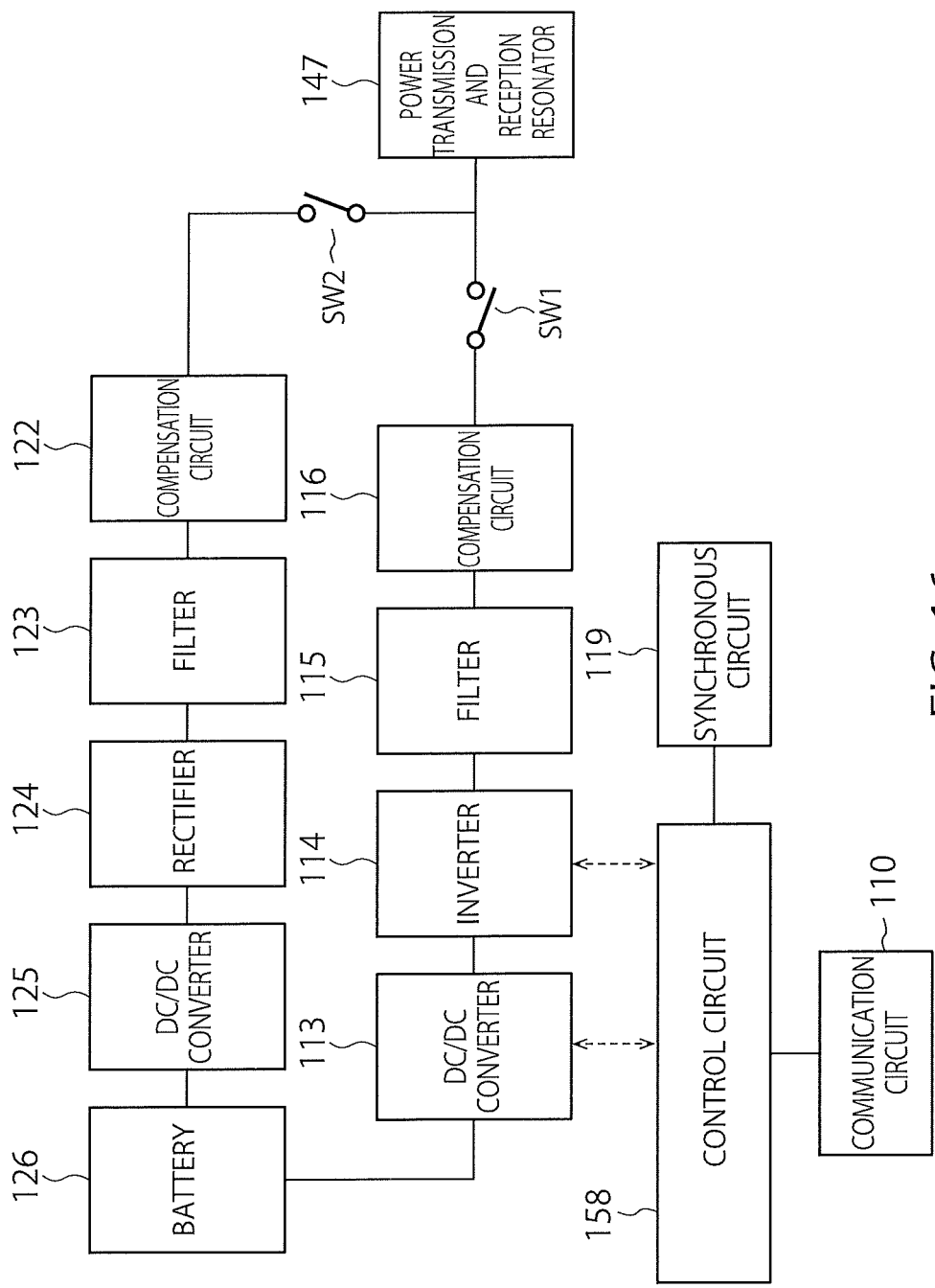
FIG. 16 shows a configuration example of a power transmission apparatus (bidirectional power transfer apparatus) having a power transmission function and a power reception function.

FIG. 16 shows a configuration example of a power transmission apparatus (bidirectional power transfer apparatus) having the power transmission function and the power reception function. This configuration basically includes the power reception apparatus (see FIG. 4) in the first embodiment, and further includes the power transmission apparatus (see FIG. 2) in the first embodiment from which the AC power source 111 and the AC/DC converter 112 are removed. Note that since the resonator is shared between power transmission and reception, this resonator is denoted as a power transmission and reception resonator 147, instead of the power transmission resonator and the power reception resonator. The battery 126 is connected to an input terminal of the DC/DC converter 113. The power transmission and reception resonator 147 is connected to the compensation circuit 116 on the power transmission side via a switch SW1. The power transmission and reception resonator 147 is connected to the compensation circuit 122 on the power reception side via a switch SW2.

A control circuit (control circuitry) 158 controls the switches SW1 and SW2. For power transmission, the switch SW1 is turned on while the switch SW2 is turned off. For power reception, the switch SW2 is turned on while the switch SW1 is turned off. During power transmission, the power accumulated in the battery 126 is transmitted. According to the configuration, the power wirelessly transmitted from the external power transmission apparatus through frequency diffusion can be received and the battery 126 can be charged with the power, and the power accumulated in the battery 126 can be transmitted to the external power reception apparatus. Similar to the first embodiment, during power transmission, the control circuit 158 performs control to perform frequency diffusion using the sweep pattern.

An electric vehicle or the like mounted with the bidirectional power transfer apparatus can be used as a virtual power plant (VPP) to stabilize the system. For example, excessive power of largely varying power generation, such as solar power generation or wind power generation is accumulated in the battery of the electric vehicle, and in case of shortage of the power generated by the solar power generation or wind power generation, the power in the battery is released to the system. In this case, during power transmission from a plurality of electric vehicles, each embodiment described above can be used to reduce the radiated emission.

The embodiments of the present invention can reduce not only the radiated emission but also the conducted disturbance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in a case where a plurality of PCSs (Power Conditioning Systems) that link solar photovoltaic apparatuses or a storage battery system to the entire system are operated in a cooperative manner, application of this embodiment to the switching frequency of each of individual PCSs can reduce the radiated emission and conducted disturbance from the PCSs.

The invention claimed is:

1. A power transmission apparatus, comprising:
   power transmission circuitry configured to generate a magnetic field by AC current flowing through a coil, and to transmit AC power by coupling the magnetic field with a coil of a power reception apparatus, wherein a frequency of the AC current is higher than a frequency of AC power supply to the power transmission apparatus; and
   control circuitry configured to change a frequency of the AC current in accordance with a first order of first to n-th frequencies during a power transmission of the power transmission circuitry, wherein the first order comprises each of the first to n-th frequencies one time.

2. The power transmission apparatus according to claim 1, wherein the control circuitry is further configured to change the frequency of the AC current in accordance with the first order at least twice during the power transmission.

3. The power transmission apparatus according to claim 1, further comprising
   synchronous circuitry configured to detect a second order of the first to n-th frequencies during a power transmission of another power transmission apparatus,
   wherein the second order comprises each the first to n-th frequencies one time, and
   wherein the synchronous circuit is further configured to determine the first order based on the second order, and
   wherein positions of the first to n-th frequencies in the first order are different from positions of the first to n-th frequencies in the second order.

4. The power transmission apparatus according to claim 3, wherein the first order is obtained by cyclically shifting the positions of the first to n-th frequencies in the second order.

5. The power transmission apparatus according to claim 3, wherein the synchronous circuitry detects a temporal cycle of changing the frequency by the other power transmission apparatus, and the control circuitry changes the frequency, based on the detected temporal cycle.

6. The power transmission apparatus according to claim 1, wherein the first to n-th frequencies are in an ascending order of the first to n-th frequencies, and
the first order is an order in which frequencies selected alternatively from among the first to n-th frequencies are arranged in an ascending order or a descending order, and subsequently remaining frequencies than the selected frequencies are arranged in a descending order or an ascending order.

7. The power transmission apparatus according to claim 3, further comprising:
a power reception resonator configured to receive AC power by coupling a magnetic field by the AC power transmitted from the other power transmission apparatus with a coil;
a rectifier circuit configured to rectify the AC power received by the power reception resonator; and
a battery configured to be charged with the power rectified by the rectifier circuit,
wherein the power transmission circuitry generates the AC current, based on the power accumulated in the battery.

8. A wireless power transfer system comprising a plurality of power transmission apparatuses,
wherein the power transmission apparatuses comprises:
power transmission circuitry configured to generate a magnetic field by AC current flowing in a coil, and to transmit AC power by coupling the magnetic field with a coil of a power reception apparatus, wherein a frequency of the AC current is higher than a frequency of AC power supply to the power transmission apparatus; and
control circuitry configured to change a frequency of the AC current in one of orders of first to n-th frequencies during a power transmission of the power transmission circuitry, the orders each comprises each of the first to n-th frequencies one time,
wherein a first power transmission apparatus among the power transmission apparatuses uses a first order among the orders,
a second power transmission apparatus among the power transmission apparatuses uses a second order among the orders, and
positions of the first to n-th frequencies in the first order are different from positions of the first to n-th frequencies in the second order.

9. The wireless power transfer system according to claim 8,
wherein the first power transmission apparatus is further configured to change the frequency of the AC current in accordance with the first order at least twice during the power transmission, and
the second power transmission apparatus is further configured to change the frequency of the AC current in accordance with the second order at least twice during the power transmission.

10. The wireless power transfer system according to claim 8,
wherein the second order is obtained by cyclically shifting the positions of the first to n-th frequencies in the first order.

11. The wireless power transfer system according to claim 8,
wherein the first to n-th frequencies are in an ascending order of the first to n-th frequencies, and
the orders each is an order in which frequencies selected alternatively from among the first to n-th frequencies are arranged in an ascending order or a descending order, and subsequently remaining frequencies other than the selected frequencies among the first to n-th frequencies are arranged in a descending order or an ascending order.

12. The wireless power transfer system according to claim 8,
wherein a plurality of the orders have different positions of the first to n-th frequencies,
when a number of power transmission apparatuses is equal to or less than a number of the orders, the power transmission apparatuses uses different orders, respectively, and
when the number of power transmission apparatuses is larger than the number of orders, the number of power transmission apparatuses using an identical order is a minimum or equal to or less than a threshold.

13. The wireless power transfer system according to claim 12,
wherein a distance between the power transmission apparatuses using the identical order is larger than a distance between the power transmission apparatuses using different order.

14. The wireless power transfer system according to claim 12,
wherein phases of AC currents in the power transmission apparatuses using the identical order are controlled,
wherein the magnetic fields of the AC powers transmitted by the power transmission apparatuses using the identical order at least partially cancel each other.

15. The wireless power transfer system according to claim 8,
wherein a number of first to n-th frequencies is changed according to a number of power transmission apparatuses.

16. A power transmission method performed by a power transmission apparatus, comprising:
generating a magnetic field by AC current flowing through a coil, and to transmit AC power by coupling the magnetic field with a coil of a power reception apparatus, wherein a frequency of the AC current is higher than a frequency of AC power supply to the power transmission apparatus; and
changing a frequency of the AC current in accordance with a first order of first to n-th frequencies during a power transmission of the power transmission circuitry, wherein the first order comprises each of the first to n-th frequencies one time.

* * * * *